Figure 1:
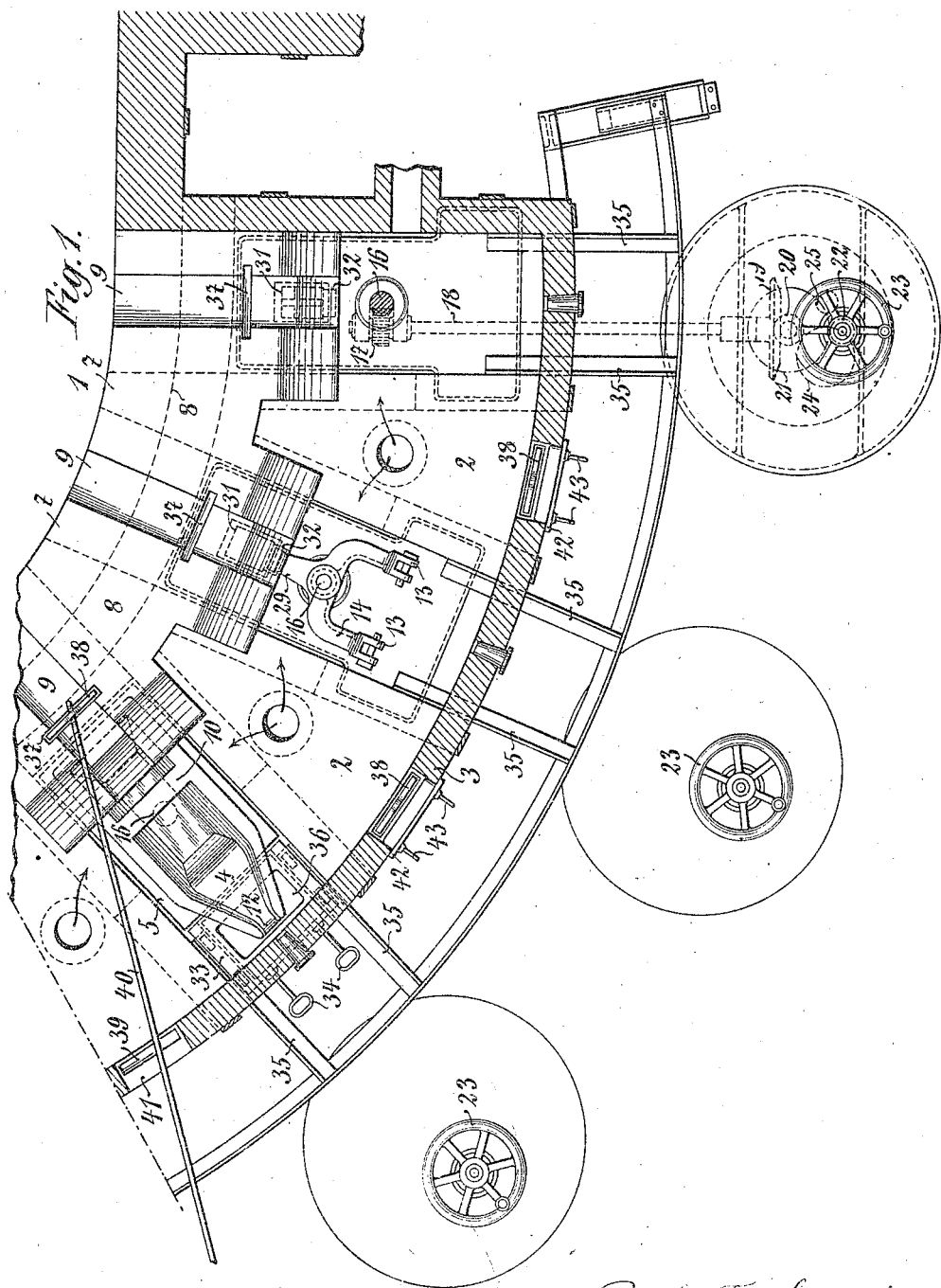

No. 861,401. PATENTED JULY 30, 1907.
P. T. SIEVERT.
MEANS FOR POURING GLASS DIRECTLY FROM MELTING FURNACES.
APPLICATION FILED MAR. 1, 1906.

4 SHEETS—SHEET 1.

No. 861,401. PATENTED JULY 30, 1907.
P. T. SIEVERT.
MEANS FOR POURING GLASS DIRECTLY FROM MELTING FURNACES.
APPLICATION FILED MAR. 1, 1906.

4 SHEETS—SHEET 2.

WITNESSES
INVENTOR
Paul T. Sievert
BY HIS ATTORNEYS

No. 861,401. PATENTED JULY 30, 1907.
P. T. SIEVERT.
MEANS FOR POURING GLASS DIRECTLY FROM MELTING FURNACES.
APPLICATION FILED MAR. 1, 1906.

4 SHEETS—SHEET 4.

WITNESSES
A. L. O'Brien
Herman Morris

Paul T. Sievert
INVENTOR
BY HIS ATTORNEYS
Bunney, Drickenstein & Ogden

UNITED STATES PATENT OFFICE.

PAUL THEODOR SIEVERT, OF DRESDEN, GERMANY.

MEANS FOR POURING GLASS DIRECTLY FROM MELTING-FURNACES.

No. 861,401.

Specification of Letters Patent.

Patented July 30, 1907.

Application filed March 1, 1906. Serial No. 303,640.

*To all whom it may concern:*

Be it known that I, PAUL THEODOR SIEVERT, manufacturer, a subject of the King of Saxony, residing in Dresden, in the Kingdom of Saxony, German Empire, Winckelmannstr. 1, have invented certain new and useful Improvements in Means for Pouring Glass Directly from Melting-Furnaces, of which the following is a specification.

It is well known that the method of ladling the glass out of the melting-furnace by means of a ladle, or the like, suffers from the defect that in consequence of the ladle being dipped into the glass the latter becomes "bubbly", *i. e.* air-bubbles are introduced into the mass of glass. Moreover, it is always a somewhat difficult and lengthy matter to transport the filled ladle from the furnace to the place where the glass is required and, moreover, there is always a certain amount of loss which is by no means insignificant due to the remnant of the glass which, of necessity, must remain in the ladle. Consequently, proposals have previously been made to draw off the glass directly from the furnace and to let it flow into the mold, in order to entirely avoid the necessity of manipulating the ladle. The invention has been to attain this by adding to the melting-furnace a fire-chamber into which the mold is conveyed, in order to be filled. The glass then runs directly from the furnace-bath into the mold and, after the latter has been filled, it is removed from the fire-chamber. This latter process is however subject to certain drawbacks, for instance, the fire-chamber, in order to be able to accommodate molds for manufacturing somewhat large objects, such as plate-glass, must be made a very considerable size. Moreover the iron molds, particularly when they are filled only gradually, are heated to an extremely high temperature in the fire-chamber which may cause the glass to adhere to the walls of the molds. Again, each time the fire-chamber is opened, a great deal of heat is lost and the holding and transporting of the heated molds is difficult and dangerous. For these reasons, the attempt to let the glass flow directly from the furnace-bath into the mold has been abandoned, but the attempt has been made to arrange a store-ladle or glass-pot, or the like, into which the glass flows from the furnace and out of which it can then be poured into the mold. Such ladles have been hitherto arranged by building them into the lower wall or bottom of the fire-chamber, in such a way that they close the fire-chamber from the out-side air by means of their surface and can be conveyed, after having been filled, to the place where pouring is to take place. This arrangement involves the great disadvantage that the walls of the ladle are not in all parts uniformly heated, so that the layer of glass at the bottom of the ladle remains colder than that at the surface which is exposed to the full heat of the fire-chamber, and this, as is well known, readily results in the glass being defective and streaky. Or, instead of this arrangement, the ladle, capable of swinging about a fixed axis, was arranged in the fire-chamber under the outlet opening or the overflow of the melting-bath, so that the ladle was emptied by tilting it upon its axle. In this case again, however, the mold had each time to be inserted in the fire-chamber, a thing which, as explained above, is disadvantageous in many respects. Also it is very difficult to permanently keep the mechanism for tilting the ladle in working order, as said mechanism is continually exposed to the high temperature of the fire-chamber. Now according to the present invention, the pouring-ladle is erected upon a section or portion of the wall of the closed fire-chamber, said section being removed from the wall when it is desired to run the glass out of the ladle. The ladle is so mounted that it is played upon on all sides, and especially at its bottom, by the furnace gases. By this arrangement, apart from a number of obvious advantages, first and foremost the advantage is attained that the requisite transporting means, instead of engaging with the ladle itself, can engage with the exterior of the wall of the fire-chamber where the temperature is by no means too high. Consequently, it is possible to employ perfect transporting means which work reliably, by the aid of which the ladle can be conveniently, safely, and, what is of the greatest importance, quickly, brought out of the fire-chamber to the molds and back again. By this arrangement the temperature of the glass in the ladle is kept in all its parts continually absolutely uniform.

The arrangement can be especially simply carried out if the ladle, together with the portion of the wall on which it rests, is removed downwards from the fire chamber, *i. e.* if it is lowered and tilted for the purpose of being discharged. With this object in view, it is only necessary to place the portion of the wall to be lowered upon a carrier to which the requisite movements for lowering and tilting it can be given.

An arrangement of this kind is represented in the accompanying drawing.

In this drawing, an arrangement is selected in which a melting-furnace is provided with a circular or semi-circular extension forming a fire-chamber. This fire-chamber is provided with a fairly large number of the new devices. The new devices could, however, of course be also arranged separately in connection with a melting-furnace.

Figure 2:
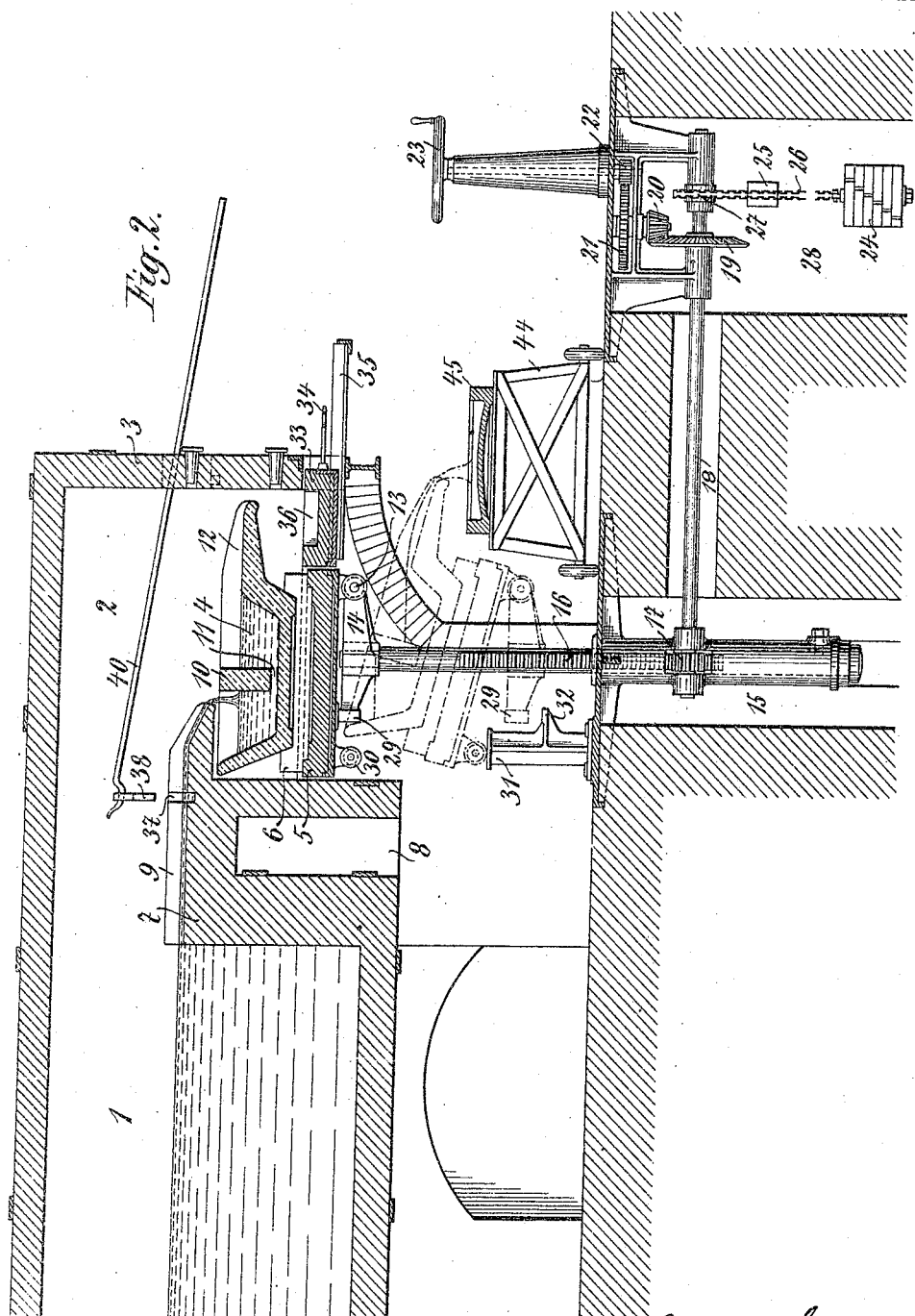
Figure 3:
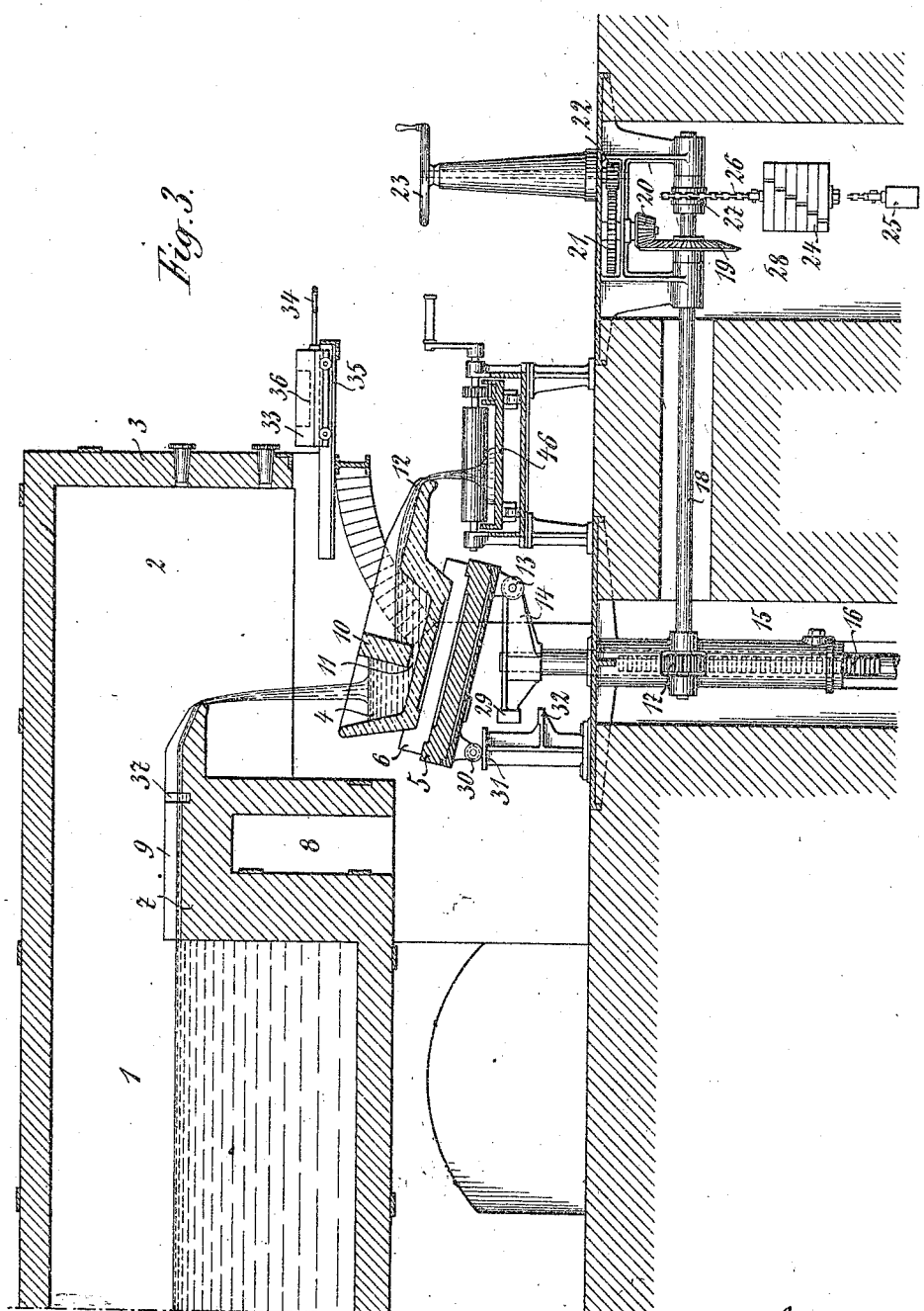
Figure 4:
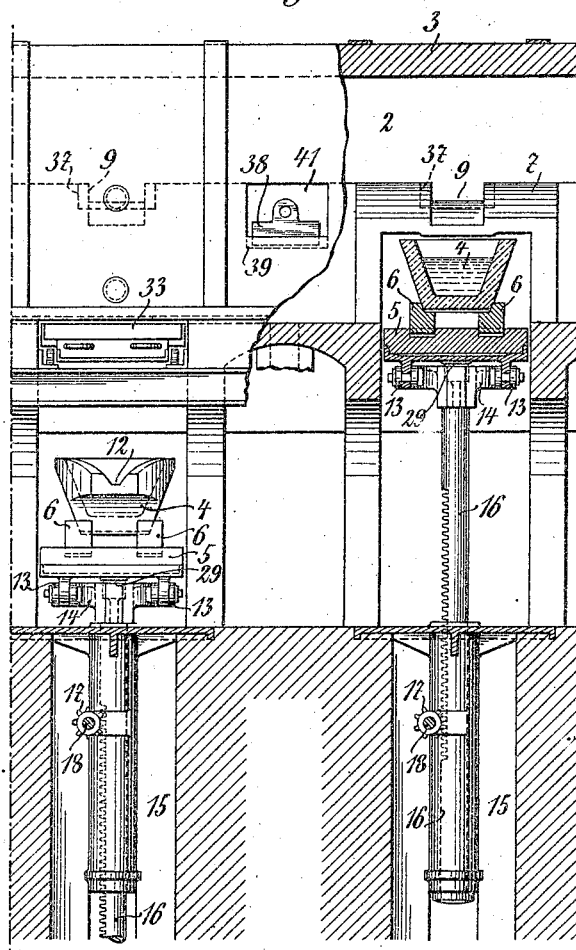

In said drawing:—Figure 1 is a part sectional plan of a melting-furnace with an arc shaped fire-chamber and with the new devices. Said devices are illustrated differently in each case, the section being taken on different horizontal planes, the section of one device being on one plane and of the other devices on other planes. Fig. 2 is a part sectional elevation through the furnace and fire-chamber. The ladle for receiving the glass-mass determined for one pouring operation is situated in its position of rest, or normal working position, i. e. inside the fire-chamber. Fig. 3 is a vertical part sectional elevation and corresponds to Fig. 2, the glass-ladle, however, being in the position which it occupies while being discharged or emptied during the pouring operation. Fig. 4, finally, is, in its right half, a vertical section through the fire-chamber of the furnace and through a ladle in its normal position of rest, and in its left half a front elevation, the ladle being in its lowered position before being tilted.

A glass melting-furnace 1, of known construction, is provided with an extension forming a fire-chamber. This is closed by means of a wall 3 formed of fire-bricks, or the like, but is connected with the inner portion of the furnace and with the fire space, so that it is kept at the melting temperature of the glass.

In the fire-chamber 2, a suitable number of pots 4 are mounted, each being on a movable plate 5, which plate, in the normal position of rest of the pot (Fig. 2), forms a portion of the wall which closes the fire-chamber. Between the plate 5 and the pot, refractory supports 6 are placed, in order to enable the furnace gases to play upon the pot even underneath it.

The melting-bath 1 of the furnace is closed from the extension 2 by means of a table 7 which may be suitably heated by means of a gas channel 8. Channels or grooves 9 formed in said table conduct the liquid glass in a thin sheet into the various pots 4. The glass passes into the back compartment of the pots, which compartment, in order to keep back impurities and bubbles floating on the surface of the glass, is separated in a well-known manner by means of a cross-piece 10 from the front compartment from which the glass is poured, in such a manner that the front compartment is connected with the back compartment only through a connecting channel 11 at the bottom of the pot.

The removal of the pots from the fire-chamber for the purpose of pouring is effected by transporting means which engage from without with the movable portion 5 of the wall upon which the pot rests. In the particular arrangement shown, the portion 5 of the wall is removed downwards and the emptying of the glass is effected by subsequently tilting the pot forwards, which enables the glass to flow along the spout 12 of the pot and into the mold 45 (Fig. 2) or on to the rolling-table 46 (Fig. 3).

The portion 5 of the wall is connected by means of the hinges 13, 13 with the carrier 14 which in the embodiment represented is fork-shaped in plan (see the middle pot, Fig. 1). The carrier 14 is mounted upon a toothed pillar or rack 16 which is displaceable in a vertical pit 15, and said pillar can be raised and lowered by means of the toothed wheel gear, 17, 18, 19, 20, 21, 22 from the hand wheel 23. The weight of the pillar 16 of the carrier 14 and of the portion 5 of the wall, as well as that of the pot, is counterbalanced by a counterweight 24. This engages with the chain 26 provided with the small counterpoise 25. Said chain passes over a chain-wheel 27 on the shaft 18. The counterweight 24 runs in the pit 28.

In the normal position of rest represented in Fig. 1 the under side of the portion 5 of the wall, at the front end of which the hinges 13, 13 are provided, rest upon the support or block 29 forming part of the carrier 14. Consequently, during the lowering operation, the piece 5 of the wall and the pot 4 first of all retain their horizontal position. However, as soon as they are at the height at which the glass is to be poured out, a stop 30 arranged at the back end of the portion 5, which stop in the embodiment represented is in the form of a roller, comes against a pillar or abutment 31 and when the carrier is lowered still more, the portion 5 of the wall, together with the pot 4 resting thereon, is tilted forwards, so that the glass runs out of the spout 12 (Fig. 3). The downward movement of the pillar 16 with the carrier 14 is limited by means of a nose 32 on the abutment 31 upon which the under end of the block 29 on the carrier 14 rests, when the pot is sufficiently tilted.

If, as is the case with the embodiment represented, the spout 12 of the pot projects over the edge of the portion 5 of the wall, room must be provided for the spout, in order to permit the pot to be lowered. This is effected in the present instance by providing in the lower wall of the fire-chamber 2, apart from the section 5, a second removable portion 33, one for each pot. These portions 33 can be drawn back on suitable guides 35 by means of handles 34, so that the spout can pass by.

In the portions 33 of the wall, reservoirs 36 are provided. In these reservoirs, the glass which may possibly flow over, collects before the emptying of the pots. This collection of glass resulting from the overflowing of the pot can be replaced in the tank from time to time.

In the channels 9 which lead over the table 7 from the melting-bath of the glass-furnace to the pots 4, grooves 37 are provided, into which firebricks 38 which act as slides or gates can be inserted, in order to close or block the channels from time to time, or to reduce the velocity with which the glass flows along said channels. The bricks 38 are usually kept in the openings 39 in the arc-shaped wall 3 for the purpose of being preliminarily warmed, in order to avoid the danger of cracking. They can, however, be moved by means of the rods 40 into their position in the grooves 37 in the channels 9, said rods 40 being introduced through openings 41 (Fig. 1). The openings 41 are, of course, usually closed, by means of covers 42 provided with handles 43. They are preferably arranged in the wall 3, one between each pair of pots, in order that the rods 40, when the bricks 38 are being inserted or removed, may not require to be pushed exactly over the pots containing the molten glass where the temperature is very high, but so that they can be moved obliquely past the pots (see the left of Fig. 1).

In the drawings, two different kinds of molds are represented into which the glass is poured. In Fig. 2, a flat mold mounted upon a carriage 44 is shown, said mold being adapted for the formation of glass layers which are then gripped by a carrying frame and blown to form a hollow article. In Fig. 3, a rolling table 46 is represented upon which the glass flows directly from the pot 4. It is obvious that these molds are merely given by way of example.

It may further be mentioned that the described arrangement for raising and lowering the carrier 14 is likewise given merely by way of example. Instead of the hand wheel 33, a motor could be used which could drive the toothed pillar by means of any suitable gear. Instead of such an arrangement, the raising and lowering of the carrier might be effected by means of hydraulic or pneumatic power.

What I claim is:—

1. The combination of a glass-melting furnace provided with a closed fire-chamber having walls with a removable portion, a pot mounted on said removable portion in such a position that in its normal position of rest it is played up beneath and on all sides by the furnace gases and receives the glass flowing from the furnace, a vertically displaceable carrier pivotally supporting said removable portion of the fire-chamber walls, a means for lowering said carrier with said removable portion and the pot mounted thereon for the purpose of enabling the glass to be poured from said pot, and an abutment arranged under the removable portion and adapted to limit the downward motion of the part of the latter engaging said abutment when the carrier is sufficiently lowered, whereby on the carrier continuing to descend the removable portion of the fire-chamber walls with the pot mounted thereon is tilted and the glass poured out.

2. The combination of a glass-melting furnace provided with a closed fire-chamber having walls with two removable portions, a pot mounted on one of said removable portions in such a position that in its normal position of rest it is played upon beneath and on all sides by the furnace gases and receives the glass flowing from the furnace, means for removing said removable portion and the pot mounted thereon from the fire-chamber for the purpose of enabling the glass to be poured from said pot and for subsequently returning said removable portion and empty pot to their normal position of rest, and means for removing the other removable portion when the first removable portion is removed for the purpose of enabling the pot to pass unimpededly out of the fire-chamber and back into the same.

In witness whereof I have hereunto signed my name this 19th day of February 1906, in the presence of two subscribing witnesses.

PAUL THEODOR SIEVERT.

Witnesses:
PAUL E. SCHILLING.
PAUL ARRAS.